(No Model.) 6 Sheets—Sheet 1.

W. F. BROWNE.
PROCESS OF AND APPARATUS FOR MANUFACTURING HEATING, ILLUMINATING, AND MOTIVE POWER GAS.

No. 263,308. Patented Aug. 29, 1882.

(No Model.)

W. F. BROWNE.
PROCESS OF AND APPARATUS FOR MANUFACTURING HEATING, ILLUMINATING, AND MOTIVE POWER GAS.

No. 263,308.   Patented Aug. 29, 1882.

Fig. 5.

(No Model.)  
6 Sheets—Sheet 5.

W. F. BROWNE.
PROCESS OF AND APPARATUS FOR MANUFACTURING HEATING, ILLUMINATING, AND MOTIVE POWER GAS.

No. 263,308.  
Patented Aug. 29, 1882.

*Fig. 6.*

Witnesses:—  
R. Sylvani  
E. P. Legran

Inventor:—  
Wm Frank Browne

Fig. 7.

UNITED STATES PATENT OFFICE.

WILLIAM FRANK BROWNE, OF NEW YORK, N. Y.

PROCESS OF AND APPARATUS FOR MANUFACTURING HEATING, ILLUMINATING, AND MOTIVE-POWER GAS.

SPECIFICATION forming part of Letters Patent No. 263,303, dated August 29, 1882.

Application filed December 19, 1881. (No model.)

*To all whom it may concern:*

Be it known that I, WM. FRANK BROWNE, of the city, county, and State of New York, have invented a certain new and useful Process of and Apparatus for Manufacturing Heating, Illuminating, and Motive-Power Gas; and I do hereby declare that the following is a clear and full description thereof, reference being had to the accompanying drawings, which form a part of this specification.

This invention consists in a new method and in means for generating gases or gaseous vapors under high pressure and carbureting the same, together with products of combustion, and then forcing the carbureted gaseous vapors into high or low pressure gasogenes or retorts in which there is incandescent material, wherein the gaseous mixture will be thoroughly decomposed and recomposed, thus forming a fixed gas for heating or illuminating purposes which can be purified in suitable purifying apparatus prior to its discharge into suitable holder or holders, where it is stored for subsequent use.

The base A, which is shown in several of the figures, is made preferably of cast-iron, and when of large diameter, or for transportation, it should be made in two or more sections with suitable flange-connection thereon, which, when put together, are held securely in place by suitable bolt-fastenings.

Figure 1:
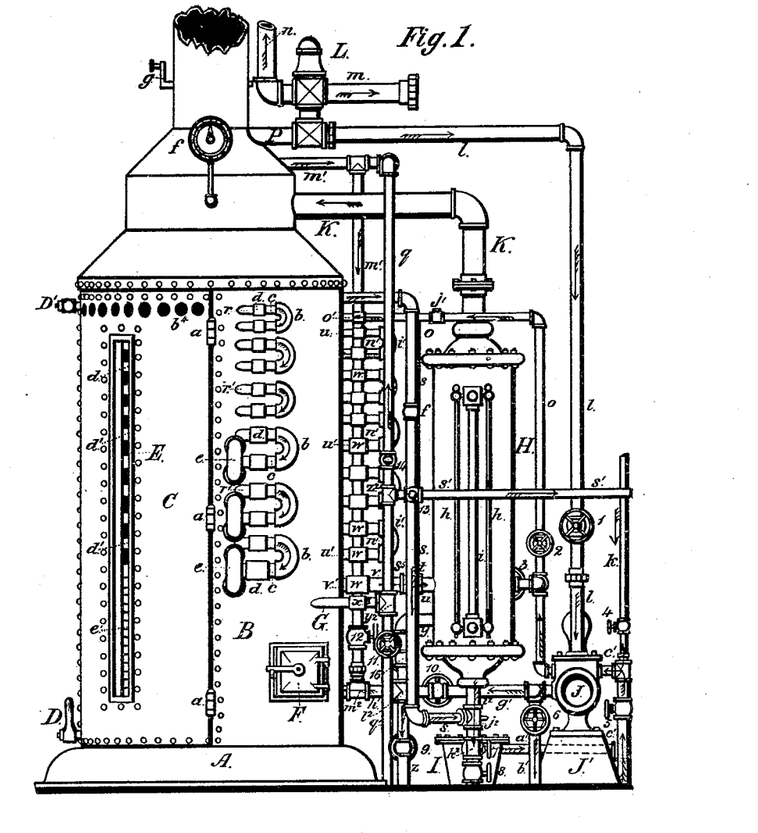
Figure 1 is the right-hand side elevation of a high-pressure gas or gaseous-vapor generator, to be used in connection with gasogenes and retorts for making gas.
Figure 2:
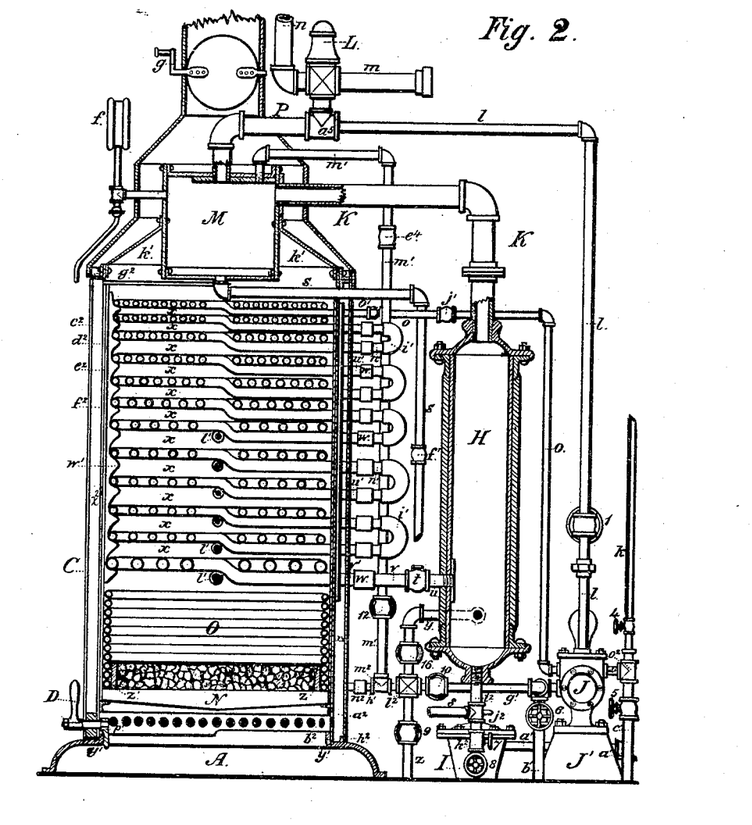
Fig. 2 is a vertical central section of the high-pressure gas or gaseous-vapor generator, showing the arrangement of the sectional generators in which the high pressure gas or gaseous vapor is generated and the device for forcing the material from which the gas is made into the generator.

The stationary portion of the shell B is mounted upon the base A and firmly secured thereto by bolts and rivets, and when the base is made in sections the shell portion B can be made to conform thereto and the parts or sections properly secured by any well-known mechanical device or devices. One side or one section of the stationary part of the shell contains the feed-door F of the furnace. The remaining portion of the shell is divided into two doors, C, which swing upon the hinges a and are kept closed by the fastening devices D, D', and p', as shown in Figs. 1 and 2. These devices will hold the upper and lower ends of the doors firmly in place, while the center can be held by a suitable clasp or other device. One of the doors is provided with a window, E, which extends nearly the length of the door. The frame of the window is made preferably of cast metal and riveted to the shell or casing of the door, and is provided with mica or suitable glass covering, through which the interior of the shell and the internal parts thereof are observed.

The frames of the doors E are made from suitable angle-iron, either rolled from wrought-iron or made from cast metal. When made from cast metal the pattern can be formed into all of the necessary curvatures, projections, rivet, and bolt holes thereto. To this frame the outer and inner casings of metal, $c^2$ $c^2$, are riveted, thus forming a clear space, $x^2$, which extends from the top to the bottom of the body of the generator. The outer casing of metal is provided with apertures $b^4$ at the top, while the inner casing of metal is provided with corresponding apertures, $b^2$, at the bottom thereof. These apertures are for the purpose of admitting the air at the top of the shell into space $x^2$, where it becomes heated on its downward passage, and is drawn through the bottom apertures, $b^2$, into the ash-pit, and thence upward between the grate-bars, where, in its heated condition, it mingles with the fuel and supports the combustion thereof. The draft can be accelerated by a jet of steam or air within the stack, or by suitable connections and devices arranged at the top of the shell, whereby air can be forced in and downward into the ash-pit and thence upward.

Figures 3, 4:
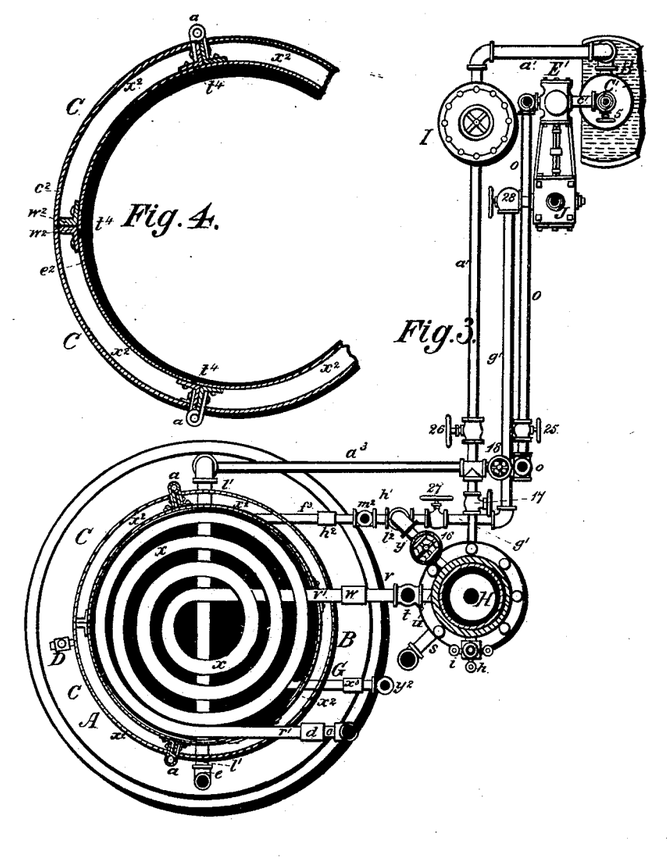
Fig. 3 is the sectional plan view of the generator and separator into which the high-pressure gas or gaseous vapor is discharged, showing the form and arrangement of one of the conduits, the outer and inner shell surrounding said conduit, and also a plan view of the pump, trap, and connecting-pipes.
Fig. 4 is an enlarged broken horizontal section of the shell or casing, showing the space between the outer and inner shells and the arrangement of the doors therewith.

In the broken horizontal sectional view, Fig. 4, it will be observed that at the joint between the two doors C C the frame or angle-iron $w^2$ $w^2$, and also the edge $t^4$ of the inner shell, $e^2$, overlaps and covers the joint formed by the frame or angle-irons to which the hinges $a$ are secured. By this arrangement a tight or close joint is obtained.

It will also be observed in Figs. 3 and 4 that the doors do not occupy quite one-half of the diameter of the shell, although one-half may be so occupied; but when made as represented in the drawings the stationary portion will be much firmer than if it did not pass the central line. The width of the door is determined by the diameter of the coil or conduits within the shell. The top of the shell or body of the generator is provided with a suitable bonnet and stack thereto.

The interior of the shell is provided with conduits or coils $x$, mounted or supported upon suitable supporting devices, $w'$, as shown in Fig. 2, and upon pipe or tubing $l'$, as shown in sectional views, Figs. 2 and 3. These pipes project through the shell and are connected by return-bend fittings $e$, and in such manner that a free circulation of liquids can be maintained through the series, and as cool liquid is forced through these pipes they become heated to a red heat. Consequently they serve the double purpose of supporting the coils and heating the liquid which may pass through them. These supporting-pipes can continue under each coil or each section of the generator; but, as the heat is not great enough to heat the sections above the fifth or sixth lower ones to a red heat, it is not necessary to continue them above the fifth or sixth coil or conduit; but if, when a gas-flame is employed, the flames should fill the coil chamber or shell, it might be necessary to introduce several more of the supporting-pipes. Those sections which are unsupported by pipes must be kept in position by straps or bars of iron secured to the turns of the coils by clips or other suitable contrivances.

The coils or conduits are coiled from pipe which is drawn to the required length, or from short lengths of pipe which are welded at their ends until the required length is obtained. The first or inner turn should be made as small as possible without flattening the pipe. After the section is completed the two ends of the pipe should project tangentially to the inner and outer circle, and parallel, or nearly so, to each other. These projecting ends should be long enough to project through the outer shell and receive suitable fittings thereon. The external projecting end lies within the plane of the coiled section, while the inner end is bent at the commencement of the turn, and after the coil is completed it is heated and bent until it comes in contact with the under surface of the coiled section, as shown in Fig. 2, where it will be observed that one-half of the coiled section rests upon said projecting inner ends.

The coiled section should be made of pipe of different diameters. The section or sections containing pipe of the largest diameter should be placed at the bottom of the series, while the smallest pipe should be at the top. A good rule to adopt in making these sections would be to allow the space between each turn to equal the internal diameter of the pipe. Thus a good and free flue-space is obtained. The size or diameter of the pipe should be greater or less, or in accordance with the different diameters of the shell, and also the number of the sections should increase with an increased diameter of the said shell.

The superheating-coil O is located in the fire-box for the purpose of gaining additional heating-surface and utilizing heat. The two ends of this coil project through the shell or wall, as shown in Figs. 2 and 3. This coil is shown resting upon the grate-bars. Consequently the complete turns cannot extend below the top of the door, while the remaining turns are provided with return-bends on each side of said door, whereby a continuous circulation is obtained through the entire length of pipe forming the superheater. When gas is to be burned in the furnace in lieu of other fuels the superheating-coil can be coiled in continuous turns until completed, thus avoiding the return-bends; and, also, the superheating-coil O can be dispensed with and the place now occupied with said coil and fuel can be filled with a suitable number of spiral conduits, which can serve the purpose of a superheater.

In sectional view, Fig. 2, a fire-brick, $z'$, is shown, which is for the purpose of protecting the bottom of the superheater, and also a lining of asbestus board or of asbestus cement, $f^2$, or other material of an analogous nature, is introduced between the inner casing or shell and the coils or conduits, whereby protection is given to the shell and radiation of heat retarded.

The ends $r'$ of the external turns of the coiled sections shown in Figs. 1 and 3 are connected by right-and-left couplings $d$ and nipples $c$ to return-bends $b$, while the inner ends, $w'$, with the exception of the upper and one or more of the lower ends, are connected by right-and-left couplings $w$ and nipples $n'$ to return-bends $i'$. The end of the upper coil, $o'$, is connected by right-and-left couplings to the pipe $o$, which is provided with a check-valve, $j'$, and valve 2, which controls or regulates the flow of the liquid as it is being forced by the pump into the upper conduit, whence it circulates by force through the entire length of said conduit, and is discharged through the lower end, $v'$, coupling $w$, nipple $v$, check-valve $t$, and nipple $u$ into separator H, wherein the steam, vapor, or gas separates from the condensations or from the liquids which may be discharged therein without evolving into steam, vapor, or gas. The separator is kept free from said liquid matter by the trap I, which forces or discharges the liquid through pipe $a'$ into a device whereby it will be returned to the generator for subsequent evaporation.

The dome M (shown in Fig. 2) is supported by braces $k'$, and is provided with the necessary pipes for conducting away steam, vapor, or gas to places of use.

The safety device L is connected to pipe P by a suitable fitting, and also the safety device is provided with the blow-off pipe $n$ and a pipe, $m$, which can be used for conducting steam, vapor, or gas to a motor or other required place or places. To the T-fitting $a^5$ the pipe $l$ is attached for conducting steam, vapor, or gas to the force-pump J. The flow through the pipe is controlled by valve 1.

$o^2$ is a T-fitting, to which the induction-pipe $c'$ of the pump is connected, valve 5 being the controlling-valve thereto. The T-fitting is connected to the pump by the nipple $d^5$. To the run of the T a small pipe, $k$, is connected, for conducting the products of petroleum or liquid combustibles to the pump, the flow of which is controlled by valve 4. Therefore, by means of the two induction-pipes $c'$ and $k$ and their valves, water and the liquid combustibles can be conducted and drawn into the pump in any proportion required. Thus heating or illuminating gas can be made in the same apparatus at will or as occasion requires; and also by closing valve 4, with valve 5 remaining open, steam can be generated for any required purpose.

The pressure of the apparatus is indicated by the gage $f$. The draft to the furnace can be controlled by the damper $g$.

Steam, vapor, or gas is conducted from the dome through pipe $m'$ to the T-fitting $m^2$, which connects to or with the projecting end of the lower turn of the superheater. The flow of the steam, vapor, or gas into said superheater is controlled by valve 12, and the exit therefrom is through pipes $s^5$ and $s'$. These pipes are connected to the superheater by the right-and-left couplings $x^3$, a close nipple, and T-fitting $y^2$. The upper end of the long nipple $s^5$ is provided with a T-fitting, $z^2$. To the outlet of this fitting the discharge-pipe $s'$ is connected. This pipe is provided with a plug-cock, 13, for controlling the outflow of the superheated steam or gas.

To the upper end of the T-fitting $z^2$ the conducting-pipe $q$ is attached, while the other end is connected with pipe $m'$ by means of elbows, nipples, and a T-fitting. The flow in the pipe $q$ is controlled by stop-cock 14, and the purpose whereof is to convert the superheater into a hot-water circulator or a steam-generator when not employed as a superheater for superheating steam or for the fixing of the gas.

The pipe $y$ connects the separator with the superheater O by means of nipples, elbows, and a cross-fitting, $l^2$. The flow of the liquid from the separator to the superheater is controlled by valve 16. A blow-off pipe, $z$, controlled by valve 9, is connected to the cross-fitting $l^2$, which can be employed to drain the superheater and also other connecting-pipes.

The exhaust-pipe $g'$ connects the exhaust-ports of the engine or motor with the cross-fitting $l^2$, whereby the exhaust from the engine is conducted into and through the superheater. Valve 10 is for the purpose of arresting the flow of the exhaust, which passes through the conducting-pipe $b'$ on opening valve 6.

The dome M and separator H are connected by pipes $s$ and $i^2$, T's $j^2 k^2$, and nipple $i^5$ to the trap I, for the purpose of conducting the condensation and liquid not evolved into steam, vapor, or gas away. The valve 7 is introduced between the trap, dome, and separator for the purpose of stopping the flow of liquid matter when the trap is to be cleaned or any of the parts connected to or with the trap may get out of order. In case this does occur valve 8 can be opened, thereby allowing the trap-liquid to escape to a waste-pipe or to some other place until the repairs are effected.

A glass gage, $i$, with protecting-rods $h$, is attached to the side of the separator H, to determine the height of the liquid in said separator.

The exterior of the high-pressure-gas-generating gasogenes $U^3$ and $T^3$ (shown in Fig. 5) should be made of boiler-plate iron firmly riveted and calked, for the purpose of making them gas-tight and to sustain the pressure required for the purposes for which high-pressure gas may or can be used. The shell of these gasogenes can be made of cast-iron and in sections, with suitable flanges cast therewith, and which can be held firmly together with bolts. The interior of the shell can be lined with suitable refractory material—fire-clay, asbestus cement, or any other material of a similar nature. The gasogene seen in vertical section is provided with grate-bars $a^6$, on which the fuel for combustion is placed. A perforated arch, $b^6$, is formed a suitable distance above the grate, thus forming a combustion-chamber, $U^2$.

Figure 5:
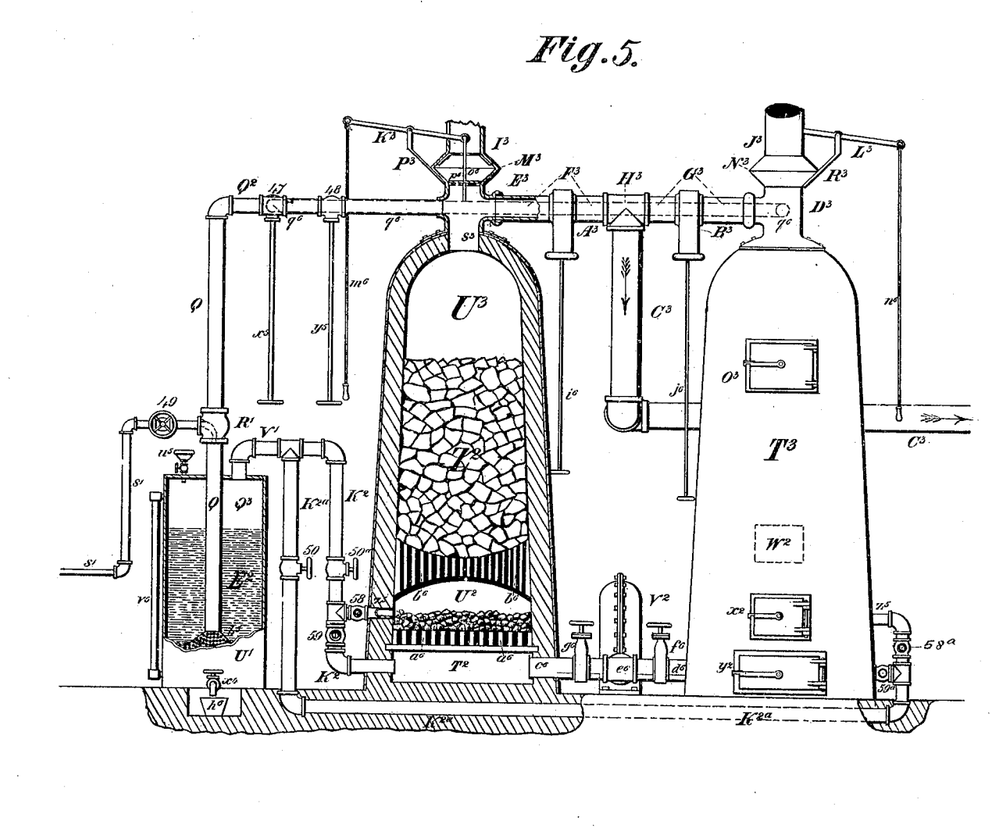
Fig. 5 is an elevation of two gasogenes, one of which is shown in section, and also a sectional view of a carbureting-tank with pipe-connections connecting with the high-pressure gas or gaseous-vapor generator shown in Fig. 1, and with the gasogenes.

The chamber $U^3$ above the arch $b^6$ is partly filled with coal $Z^2$, or it can be filled with limerock or any other material from which an inflammable gas can be evolved. An air-space or ash-pit, $T^2$, is formed beneath the grate $a^6$, into which air is forced through pipe $c^6$, on opening gate $g^6$, by blower $V^2$. The discharge of the blower is connected to the outlet of T-fitting $e^6$, while to the run of said fitting the conducting-pipes $c^6$ and $d^6$ for conducting air to the gasogenes are connected.

The chamber $U^3$ is charged with gas-producing material $Z^2$ through door $o^3$. The door $W^2$ (represented by dotted lines) is where the refuse material can be discharged or withdrawn. The door $x^2$ is where the furnace $U^2$ is charged with coal, and through the door $y^2$ the ash-pit is cleared of ashes and cinders. All of the doors should be tightly fitted to the shell or casing and held in position by a cotter-bar or some other suitable contrivance whereby the doors can be easily managed.

When the fires are first made in the furnace the products of combustion pass through the openings in the arch $b^6$, and through the material $Z^2$, whereby it becomes gradually heated, while the products of combustion pass off through the uptake $s^3$, thence through valve-chamber $M^3$ into and through the smoke-stack $I^3$. The fittings $E^3$ and $D^3$ can be made in the form as shown, or in any other suitable form which can or will perform the same or similar functions. The fittings are by preference made of cast-iron and bolted to the wrought-iron casing or shell. The outlets of these fittings are provided with the necessary adjuncts, which consist in the valve-chambers $M^3$ and $N^3$, eduction-pipes $Q^2$ and $q^6$, $F^3$ and $G^3$. These pipes are provided with controlling-valves 47 48 and $A^3$ $B^3$, which are operated by drop-stems and wheels $x^5$ and $y^5$ and $i^6$ and $j^6$. The two pipes $F^3$ and $G^3$ are connected by T-fitting $H^3$. To the outlet of this fitting the eduction-pipe $C^3$ is secured, and drops down between the two gasogenes at any suitable distance, from whence it is directed to any point desired.

The valve $p^6$ should be made of heavy and refractory material and closely seated upon a ledge in the interior of the fitting $E^3$. The valve is provided with a stem, $o^6$, and operating-lever $K^3$, which rocks or turns upon the fulcrum $P^3$ when power is applied to cord and handle $m^6$.

The two pipes $Q^2$ and $Q$ connect the two gasogenes with the carbureting-tank $U'$. The lower end of pipe $Q$ is provided with the spray-funnel $b^5$. The tank $U'$ is provided with the filling device $u^5$, glass gage $v^5$, and drain-cock $x^4$, and receptacle $h^6$. The exit of the gaseous or volatile products from the tank $U'$ is through pipe $V'$, from thence through either pipe $K^{2a}$ or $K^2$, or it may be forced simultaneously through both pipes, from whence the gaseous product can be discharged into the ash-pit $T^2$ or furnace $U^2$ by opening either of the valves 58 or 59 or $58^a$ and $59^a$.

The drop-pipe $Q$ is provided with an injector, $R'$, which receives its injecting force through conducting-pipe $s'$ from the high-pressure steam, gas, or gaseous-vapor generating apparatus shown in Fig. 1. The flow through pipe $s'$ is controlled by valve 49.

Figure 6:
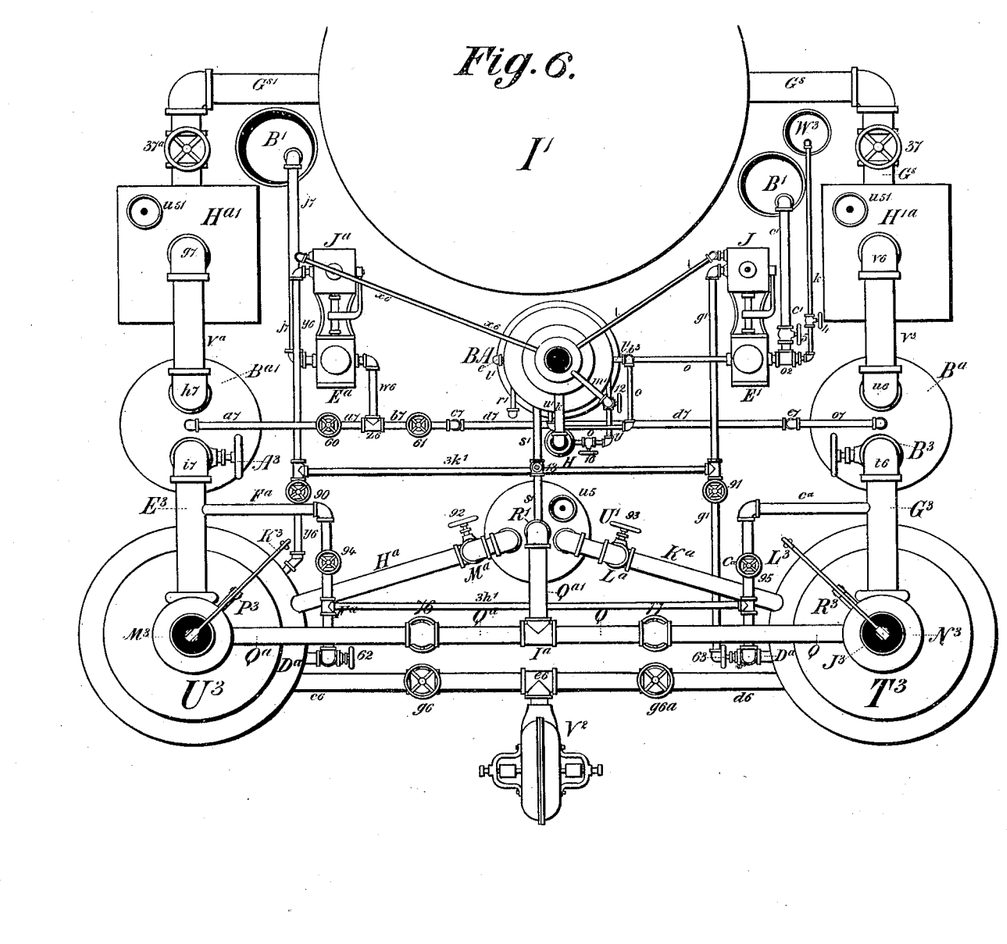
Fig. 6 is a top plan view of a plant of gas-works, or a plan view of a gas-generating apparatus, showing a high-pressure steam and gas or gaseous-vapor generating apparatus, pump, and cistern for holding water and liquid combustibles, carburetor, two gasogenes, scrubbers, purifiers, and a gas-holder, and the necessary connecting-pipes and adjuncts pertaining to the manufacture of gas for heating and illuminating purposes.

In the top plan view, Fig. 6, a complete plant of gas-works is shown. The distribution of the various parts of the apparatus or works can be arranged to suit the area of the ground on which they are erected. The plant herein shown can be increased in size or duplicated in whatever part or parts may be required to meet the demand for gas, and also one set of works can be used exclusively for the manufacture of illuminating-gas, while another set of works can be devoted to the entire production of heating-gas, or both gases can be made in alternating periods of time in either or both of the sets of works.

The gasogenes $U^3$ and $T^3$ are located at a suitable distance from each other, and they are connected by pipes $Q^a$, $Q$, $Q^{a\prime}$, $H^a$, and $K^a$ to the carbureting-tank $U'$. Pipe $Q^{a\prime}$ is provided with an injector, $R'$, which receives an injecting force from the high-pressure-gas generator B A through pipe $s'$. This generator can be supplied with water or combined water and combustible liquids by the forcing device J $E'$, which exhausts said liquids from cistern or tanks $B'$ and $W^3$ through eduction-pipes $c'$ and $k$ and forces them through pipe $o$ into said high-pressure generator. The motive force is conducted from the generator B A through pipe $l$ to cylinder J. The exhaust from this cylinder is conducted through pipe $g'$ to gasogene $T^3$; or it can be conducted to any other place or places of use. Pipes $c^a$ and $F^a$ are for conducting gas from the gas-mains $G^3$ and $E^3$ and discharging it into the furnace of the gasogenes $T^3$ and $U^3$. Valves 62 and 63 are for controlling the discharge of gas through nozzles $D^a$.

The pipes $w^6$, $a^7$, $b^7$, $d^7$, and $o^7$, with fittings $z^6$, $c^7$, and $e^7$, are for conducting water from pump-cylinder $E^a$, which receives its water through eduction-pipe $j^7$ and from tank $B'$ and forces it out through a sprayer (not shown) in scrubbers $B^a$ $B^{a\prime}$. The gas is discharged from the scrubbers through pipes $v^3$ and $v^a$ into the purifiers $H'^a$ and $H^{a\prime}$, from whence it is discharged through pipes $G^8$ and $G^{8\prime}$ into the gas-holder $I'$ or into other places for immediate use. The power-pump $E^a$ and $J^a$ receives its motive force through pipe $x^6$ from the generator B A. The exhaust is discharged through pipe $y^6$ into the gasogene $U^3$.

Pipes $c^6$, $d^6$, and T $e^6$ are for conducting air from the blower $V^2$ into the gasogenes, the air being forced into the gasogenes alternately by opening and closing gates or valves $g^{6a}$ and $g^6$. The two exhaust-pipes $g'$ and $y^6$, leading from the pumps to the gasogenes, are connected by pipe $3^{k\prime}$, so that by the controlling-valves 90 and 91, the exhaust from both pumps can be forced conjointly into the furnace of either one of the gasogenes.

The two supply-pipes $F^a$ and $c^a$ for conducting gas from the mains $G^3$ and $E^3$ to the furnaces of the gasogenes are connected by pipe $3^{h\prime}$, for the purpose of conducting gas alternately from one gasogene to the other. The two valves 94 and 95 are for controlling the action thereof.

A broken sectional view of the high-pressure gas or gaseous-vapor generator shown in Fig. 1 is shown in connection with the carbureting-tank $U'$ and a bench of retorts. (Shown in Fig. 7.)

Figure 7:
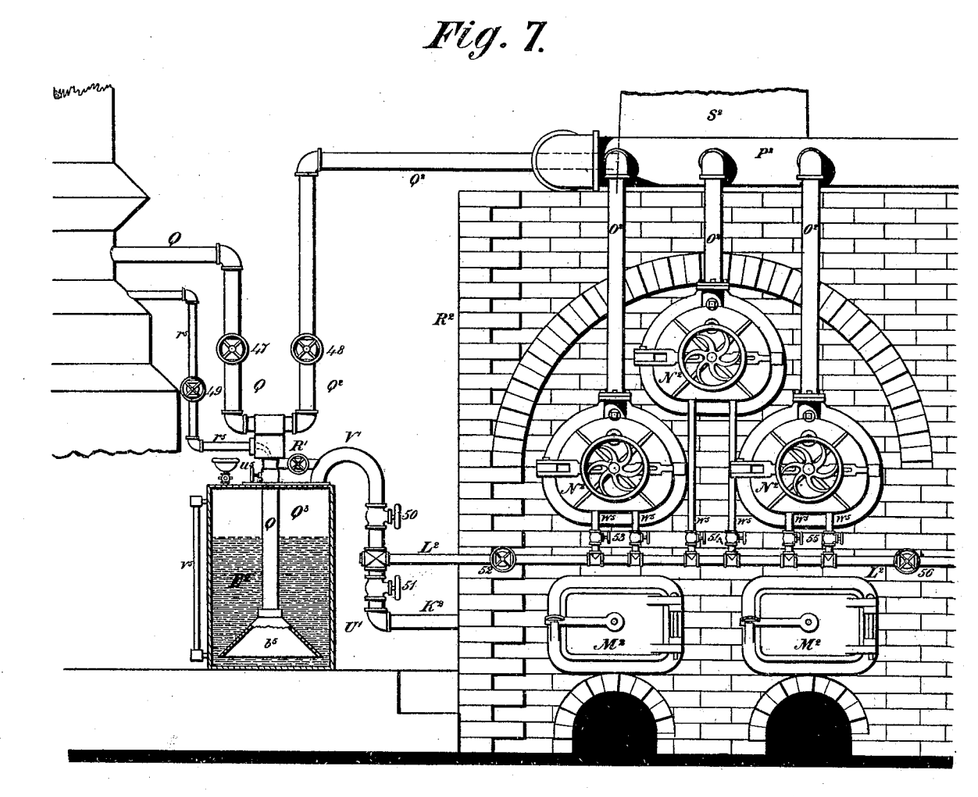
Fig. 7 is the elevation of the upper portion of a high-pressure steam or gas or gaseous-vapor generator, the vertical section of a tank or reservoir for holding liquid combustibles, and the front elevation of a bench of retorts into which carbureted products of combustion or steam or gas from the said steam and gas generator are forced.

The pipes Q and $Q^2$ are for conducting the products of combustion from the high-pressure gas or gaseous-vapor generator to the bench of retorts $R^2$. These two pipes Q and $Q^2$ unite at the injector $R'$, and the contents thereof are discharged into the inverted spray-funnel $b^5$, from whence the contents ascend through the combustible liquid $E^2$ into the open space $Q^3$. From thence the products or gaseous vapor are forced through pipe $V'$, valves 50 or 51, and pipes $L^2$ or $K^2$. When forced through pipe $L^2$ and valve 52, on opening valves 53, 54, and 55 on pipe $w^5$ the gaseous vapor or gas will be discharged into the retorts $N^2$. The flow of gaseous matter therein can be regulated by the above-mentioned valves. The fixed gases pass from the retorts through stand-pipes $o^2$ into the main $P^2$, from whence it can be conducted to whatever place necessary. Pipe $r^5$, with controlling-valve 49, is for conducting steam or gas or gaseous vapor to the injector $R'$, and is used as a motive force for exhausting the products of combustion from the stacks of the high-pressure-gas generator and the bench of retorts $R^2$.

The high-pressure gas or gaseous-vapor generator B A (shown in Fig. 1) can be applied or used in connection with all classes of retorts for generating either illuminating or heating gases; but whenever the generative force of the gas is to be utilized for a motive power wherein high pressure is required the retorts will have to be made of some material and in such a manner that they can withstand the pressure required, the minimum of which should be about fifty pounds, while the maximum need not exceed two hundred pounds per square inch. When any part of the gas is made from coal it should be purified before passing through a motor, thus avoiding the gumming up or fouling of the motor with coal-tar, which might be the case were the gas conducted directly from the retort to said motor; and, also, the apparatus for purifying the gas should be made strong enough to resist the pressure while passing through to the motor or while being transmitted long distances through pipes.

Heating-furnaces of all classes can be supplied with gas directly from the retorts, wherein it can be made in connection with the high-pressure gas or steam or gaseous-vapor generator in ample or sufficient quantity to meet the demands of any furnace in use. When furnaces are made of sufficient strength the gas or gaseous vapor can be forced in under any pressure less than the maximum capacity of the generating apparatus. When the gas is properly fixed it can be forced long distances and supply gaseous fuel for furnaces, and to fill gas-holders for illuminating and heating purposes.

When gas is to be made exclusively for heating purposes for immediate use, and without the necessary fixation and purification required in the manufacture of illuminating-gas, and a high pressure is not needed, the following method or process can be adopted with the apparatus herein described—that is, wherein the description refers to the production of gas by means of the high-pressure-gas generator, carburetor, and retorts shown in Fig. 7.

When solid carbons are to be utilized in the production of gas the retorts $N^2$ are to be charged therewith, fires made in the furnaces, and the retorts and contents thereof heated to incandescence. In the meantime fire is made in the furnace of the high-pressure-gas generator and the carbureting-tank $U'$ is charged with a suitable supply of combustible liquids, after which the combined apparatus is ready for the operation of manufacturing a heating-gas for immediate use, said gas being made by decomposing and recomposing the elements which form water, combustible liquids, the products of combustion, and solid carbonaceous matter. On opening valve 49 steam, gas, or gaseous vapor will be discharged from the high-pressure generator through pipe $r^5$ into the injector $R'$, by which, on opening either one or both of the valves 47 48, the products of combustion will be drawn or exhausted from either one or both of the uptakes of the high-pressure generators and bench of retorts through eduction-pipes Q $Q^2$ and discharged or forced through pipe Q into the perforated funnel, from whence it is sprayed out into the surrounding combustible liquid $E^2$, wherein the gaseous mixture becomes carbureted as it ascends to the space $Q^3$, from which it is forced by the incoming gaseous mixture through pipe $V'$ on opening valve 50 into pipe $L^2$; from thence, on opening valves 52, 53, 54, and 55, through pipe $w^5$, into the retorts $N^2$, where it comes in contact with the incandescent carbonaceous material, the gas of which combines with the necessary gaseous mixture and passes off through suitable conducting-pipes, $o^2$, into places for immediate use.

A portion of the carbureted gaseous mixture can be diverted from pipe $V'$ on opening valve 51 and forced through pipe $K^2$ into the furnace and burned therein, the heat generated thereby aiding in generating gas from the coal in the retorts. Enough of the gaseous mixture can be diverted to supply all of the heat required in the said retort-furnaces without other fuel. Instead of diverting the gaseous mixture from pipe V', it can be conducted by suitable pipe-connection from the main pipe P² and discharged into the furnace, thereby transmitting all of the heat which is in the gas to the furnace, thus saving an amount of fuel which would be required to produce the amount of heat so transmitted. When the gas is to be stored in gas-holders or forced long distances for heating and illuminating purposes, it should be thoroughly fixed in the retorts and then purified.

The two pipes Q and Q² can be dispensed with and only the pipe $r^5$ used for conducting products from the high-pressure generator in connection with the carburetor U'; and, also, steam can be generated in the high-pressure generator and forced through the carburetor, wherein it will become carbureted, and from thence into the retorts, where it will combine with the incandescent carbonaceous substance and pass off in a gas to places of use.

The high-pressure generator can be employed in connection with the retorts without the interposition of the carbureting-tank U' simply by forcing water and combustible liquids into the generator, where a gas or gaseous vapor will be formed under pressure and discharged therefrom into the retorts, where, with the carbonaceous substance therein, a fixed gas will be formed, for the purpose already specified.

When the carburetor is employed in connection with the high-pressure generator and retorts two or more should be employed and suitably arranged and connected, so that the gaseous vapor, gas, or steam from the high-pressure generator can be forced through either one of them, as will be required, on account of recharging with combustible liquids. If but one tank is used, the liquid can be forced therein against the back-pressure by means of a pump or other forcing devices.

The mode of manufacturing gas in the apparatus shown in Figs. 5 and 6 is as follows: After the two gasogenes are charged with carbonaceous material, $Z^2$, raise the valves $p^6$ by pulling the cords $m^6 n^6$, and then build the fires in the furnaces $U^2$ and $T^3$; start the blower $V^2$. If gas is to be made first in gasogene $U^3$, open gate $g^6$ and blow the fire in furnace $U^2$ until the material $Z^2$ becomes incandescent, after which open gate $f^6$ and close gate $g^6$. In the meantime steam should be generated in the high-pressure generator shown in Fig. 1, and the carbureting-tank should be charged with a suitable supply of combustible liquids. Open valves 4 and 5 on pipes $k$ and $c'$, Fig. 1, and force the combustible liquids combined with water into the high-pressure generator, where a gaseous vapor or gas will be formed, which can be fixed by passing through a superheater in connection with the generator when necessary, or it can be conducted directly from the dome, which is located within the bonnet or shell. If the gaseous vapor or gas is forced from the dome to the superheater, the exit therefrom will be through pipe $s'$, on opening valve 49, into the injector R'. Now, considering that all parts of the apparatus are ready for the operation of making gas, the following directions must be adhered to: Close valve 48 and open valve 47; close both valves $p^6$ in the uptakes, so as to prevent the escape of the products of combustion through said uptakes, thus diverting the said products of combustion from gasogene $T^3$ through pipe $q^6$ (shown in dotted lines) to the injector R', from whence it is discharged through pipe Q and sprayed out into the combustible liquid $E^2$, wherein it becomes carbureted. Close gate $B^3$ on eduction-pipe $G^3$ and open gate $A^3$ on pipe $F^3$. Now open valve $50^a$ and plug-cock 59 on pipe $K^2$, whereby the gaseous mixture in the carbureting-tank is forced therefrom into the base or ash-pit of the gasogene, from whence it is forced up through the heated material $Z^2$, where, in combination with the heated material, a fixed gas is made, which is now forced through the outlet $s^3$ into and through eduction-pipe $F^3$, gate $A^3$, and T-fitting $H^3$, from whence it is discharged through eduction-pipe $C^3$ into the necessary purifiers and gas-holders, or into places of immediate use. After the heat in the gasogene $U^3$ has been reduced to a temperature too low for the production of a fixed gas the following changes must be made: In order to continue the process, valve 50 on pipe $K^{2a}$ and plug-cocks $59^a$ and $58^a$ must be opened and valve $50^a$ and plug-cocks 58 59 on pipe $K^2$ closed, thus conducting gaseous mixture from the carbureting-tank U' into gasogene $T^3$. Now open air-gate $g^6$ on pipe $c^6$ and close air-gate $f^6$ on pipe $d^6$. Now close gate $A^3$ on pipe $F^3$ and open gate $B^3$ on pipe $G^3$, and then open valve 48 on pipe $Q^2$ and close valve 47 on pipe $q^6$. The gas will now be making in gasogene $T^3$ and passing off through pipe $C^3$. By this method of making gas the products of combustion can all be converted to a fixed illuminating or heating gas and stored in gas-holders for subsequent use; but when required for immediate use in metallurgical or other analogous furnaces that require a great amount of heat the gas can be directed therein and consumed without fixation and purification. It can also be delivered under high or low pressure when required. These gasogenes can be connected directly with the high-pressure generator shown in Fig. 1 without the carbureting device U'.

Superheated steam can be generated in the high-pressure generator and discharged into the gasogenes and be decomposed by the material $Z^2$ and recomposed and forced out through the connecting-pipes hereinbefore mentioned; and, also, the superheated steam can be employed to exhaust the products of combustion and force them into the gasogenes, the same as above mentioned.

While the gas is being made in gasogene $T^3$ the fires in gasogene $U^3$ are being blown and the material heated for another change in the gates and valves, as above described. It will not be necessary to charge the furnace $U^2$ with coal or other solid fuel, for a portion of the gaseous mixture proceeding from the carbureting-tank $U'$ can be directed through pipe $K^2$ on opening valve $50^a$ and cock 58, and be discharged through nozzle $z^5$ into the furnace, wherein, with the air from the blower $V^2$, a complete combustion will be effected. The heat generated therefrom will be sufficient to heat the material $Z^2$ by the time the change of valves and gates is to be made. When the change is made plug-cock $59^a$ should be closed and $58^a$ opened, thus allowing the gaseous mixture to be discharged through pipe $z^5$ into the furnace of the gasogene $T^3$. Therefore after the fires are first made from solid fuels there will be no necessity for recharging again while the operation of manufacturing gas is being carried on, with the exception of the time when the gasogenes are cooled off for repairs or for other purposes; and, furthermore, the gas which is stored can be conducted to the furnaces and furnish heat to commence operations with, after which the hot gases can be employed for the purpose set forth. Gas can also be conducted from the gas-main $C^3$ to the furnace and burned therein.

The gasogenes can be charged with lime-rock or other substances analogous thereto and the carbonic-acid gas expelled therefrom by the hot-air blast which is forced through the broken mass shown in the figure. The carbonic-acid gas which is expelled therefrom is drawn and forced by the injector $R'$ into the carbureting-tank $N'$, where it becomes carbureted, and then forced therefrom into the alternate gasogene, where a thorough decomposition and recomposition of all of the elements are effected, and then forced away and stored for subsequent use.

The operation of manufacturing gas will be more fully understood by referring to the top plan of a plant of gas-works, as seen in Fig. 6. The description of the several parts as given above will be referred to in the following description of the operation thereof.

To commence the operation the gasogenes $U^3$ $T^3$ are at first charged with carbonaceous substance and heated by fires built beneath said substance. The valves $p^6$ (shown in Fig. 5) are left open for the escape of the products of combustion for the purpose described in the preceding figure. In the meantime the fire should be built in the high-pressure generator B A, which has been previously charged with water by pump J $E'$, drawn from cistern $B'$ through pipe $c$ on opening valve 5, and forced through pipe $o$ into the generator, where steam is generated to drive the pump with prior to making the gas. The tank $U'$ must have been charged with combustible liquids prior to building the fire, and the material for purifying the gases in the purifiers $H'^a$ and $H^{a'}$ should be properly arranged before the work of making gas commences. The blower $V^2$ should now be set in motion to blow the fire in one of the gasogenes. If the fire is to be quickened in gasogene $U^3$, gate or valve $g^6$ must be opened, thus allowing air to be discharged into the furnace $U^2$. (Shown in Fig. 5.) After sufficient heat is derived therefrom in the gasogene, close valve $g^6$ and open valve 4 on pipe $k$, which leads from the tank or cistern $W^3$, which contains the combustible liquid, thus allowing said liquid to be drawn, with the water, into the pump, where it will be combined and forced therefrom into the high-pressure generator B A, where a gaseous vapor or gas is formed, and from whence it is discharged, on opening plug-cock 13 on pipe $s'$, into the injector $R'$, and from thence into the carbureting-tank $U'$. Now that this part or division of the method is ready for operation, open valve 77 on pipe Q and keep valves $B^3$ on pipe $G^3$ and 95 on pipe $c^a$ closed, after which open gate or valve $g^{6a}$ on pipe $d^6$ and blow the fire in gasogene $T^3$. The products of combustion arising therefrom will be drawn and forced by the injector through the combustible liquids in the carbureting-tank $U'$, from whence it will be discharged, on opening valve 92, through pipes $M^a$ and $H^a$ into the furnace $U^2$ of the gasogene $U^3$. (Shown in Fig. 5.) From thence the gaseous mixture will be forced up through the incandescent carbonaceous material, where, in combination therewith, a fixed gas will be formed, which will be forced therefrom through pipe $E^3$, on opening valve $A^3$, into the scrubber $B^{a'}$, where it will come in contact with a spray of water, which will be forced therein by pump $J^a$ $E^a$ through pipe $w^6$ and $a^7$ on opening valve 60. The gas will pass from the scrubber through open pipe $V^a$ into the purifier $H^{a'}$, and from thence, on opening valve $37^a$, through pipe $G^{s'}$ into the gas-holder $I'$. After the heat has been so far reduced in the gasogene $U^3$ that a good gas cannot be made, the following change must take place in order to make gas continuously: Close valve $g^{6a}$ on pipe $d^6$, thus preventing any more air from entering gasogene $T^3$. Open valve $g^6$ on pipe $c^6$ and discharge air into the furnace of the gasogene $U^3$. Close valve 77 on pipe Q, thus preventing any passage through that pipe. Open valve 76 on pipe $Q^a$, thereby allowing the products of combustion to be drawn by the injector $R'$ and forced into the carbureting-tank $U'$, wherein the gaseous mixture is carbureted and thence discharged therefrom, on closing valve 92 and opening valve 93, through pipe $K^a$, into the gasogene $T^3$, wherein it rises through the heated material and becomes converted to a fixed gas, and thence it is discharged therefrom through pipe $G^3$, on opening valve $B^3$, into the scrubber $B^a$, wherein the gas will come in contact with water-spray, which is forced therein by the pump $J^a$ $E^a$, on closing valve 60 and opening valve 61, through pipe $w^6$, $b^7$, $d^7$, and $o^7$. The gas is forced from the scrubber through open pipe V³ into purifier H'ª, and from thence, on opening valve 37, through pipe G⁸ into the gas-holder. After the reduction of heat in gasogene T³ the valves and gates are again to be changed, as above described, whereby a continued process of making gas is effected. The two pumps are run by the high-pressure gaseous vapor or gas generated in the high-pressure generator B A. The exhaust gaseous vapor or gas from these pumps is conducted by pipes g' and y⁶ to the gasogene-furnaces, where it is burned; or it may be converted to a fixed gas in connection with the gaseous mixture discharged from tank U'; but when converted to a fixed gas the exhaust from both pumps should be run or discharged into the same gasogene in which the carbureted gaseous mixture is discharged. This is done by connecting the two exhaust-pipes g' and y⁶ with pipe 3ᵏ' in the following manner: If gas is being made in gasogene U³, valve 91 on exhaust-pipe g' must be closed and valve 90 on pipe y⁶ opened, thus allowing the exhaust in pipe g' to pass through cross-pipe 3ᵏ' into exhaust-pipe y⁶, where it unites with the exhaust gaseous vapor or gas in said pipe y⁶, from whence the exhaust from the two pumps is forced into the furnace. When the change occurs for making gas in the gasogene T³ it is only necessary to close valve 90 on pipe y⁶ and open valve 91 on pipe g' to divert the exhaust into the furnace of said gasogene T³; but when said exhaust is to be used as a fuel the same change of valves will occur, but in a reverse order, or in opposition to the conditions above described.

Gas can be conducted from the pipes G³ and E³ through pipes cⁿ Fⁿ on opening valves 94, 95, 62, and 63. This gas must necessarily be conducted from the discharge-pipe of the gasogene in which gas is being made to the gasogene in which the blast is in operation. This is effected by the cross connecting-pipe 3ʰ', valves 94, 95, 62, and 63.

The principle herein enunciated, and shown in Figs. 5, 6, and 7, can be applied to any gas-works now in use and of sufficient magnitude to meet the requirements of said works. The high-pressure generator B A can be duplicated, as well as carbureting-tanks and general apparatus for the purification of gas. The gas can be made under high or low pressure, as hereinbefore described. Heating or illuminating gas can be made when required. Two gas-holders can be employed for storing heating and illuminating gases separately and alternately filled from the same works; or one gasogene can be employed exclusively to manufacture illuminating-gas, while the other can be used for the manufacture of heating-gas, as the difference of the two gases is in the quality or quantity of carbon used. The change can be easily effected by the introduction of more or less water and combustible liquid into the pump, which will force the combined liquid into the generator when gaseous vapor or gas is generated and forced therefrom, as above described.

The tank U' can be provided with a perforated spiral or other suitably-formed coil, which, when of the spiral form, should be located near the top of the tank, with the perforated side underneath. This coil can be connected with a pump which can force combustible liquids into the spiral coil and force said liquid out into the tank in the form of a spray, which will come in contact with the gaseous mixture rising from the sprayer in the bottom of the tank. By dividing the combustible liquid minutely a more perfect volatilization will occur than when the said liquid lies in a body, as shown in Fig. 5. Only enough combustible liquid need be forced in to supply the demand of the products to be carbureted.

I reserve to myself the right to claim in a future application or applications for Letters Patent all of the patentable matter which cannot be claimed in this application.

What I claim, and desire to secure by Letters Patent, is—

1. The process of generating gas, which consists in first producing a gaseous vapor by forcing oil and water under pressure into and through a generator, then forcing the resulting mixed vapors, together with products of combustion, through a liquid hydrocarbon for taking up the vapors thereof, and then decomposing and fixing the mixed vapors by forcing them into contact with heated material in closed chambers.

2. The process of producing gas, consisting of first carbureting the products of combustion by injecting them, by means of a jet of gaseous vapor, into a carburetor, then forcing the resulting mixed vapors into contact with carbonaceous material in hot retorts, and then combining and decomposing the mixture with the gases of the carbonaceous material, whereby a fixed gas is produced.

3. In an apparatus or plant for manufacturing gas, the combination of a high-pressure gas or gaseous-vapor generator, a carbureting-tank, gasogenes, scrubbers, purifiers, gas-holders, with the pump, and suitable connections, all adapted to operate in a continuous manner, as described.

4. In a gas apparatus, the two connecting reciprocating gasogenes or generators, in combination with a blower and a carburetor, and valved pipes connecting the tops of the generators to the carburetor, and valved pipes connecting the carburetor with each generator at the bottom, whereby the products from one generator may be carbureted and the carbureted products at the same time converted into a fixed gas in the other alternately.

5. In a gas apparatus, a gasogene provided with eduction-pipes at its top and two independent grates at its bottom, in combination with a carburetor and connecting-pipes and valves, as described.

6. In a gas apparatus, a gasogene or generator having an eduction-pipe and two independent grates, in combination with a carburetor provided with a supply-pipe for steam or gas, and eduction-pipe connecting with the said gasogene, as described.

7. In a gas apparatus, the two reciprocating gasogenes, in combination with the connecting-pipe at the top, provided with two valves or gates, an eduction-pipe, $C^3$, connecting between said valves, and a blower connecting with each of the generators by pipes provided with controlling-valves and suitable supply-pipes for carbureted vapor, whereby the heat may be raised in one while gas is generated in the other alternately, as described.

WM. FRANK BROWNE.

Witnesses:
ROBERT SYLVANI,
E. A. LEGRAND.